US006603639B1

(12) United States Patent
Polycarpou et al.

(10) Patent No.: US 6,603,639 B1
(45) Date of Patent: Aug. 5, 2003

(54) SLIDER FOR DISC STORAGE SYSTEM

(75) Inventors: Andreas A. Polycarpou, Champaign, IL (US); Zine-Eddine Boutaghou, Vadnais Heights, MN (US); Daniel P. Burbank, Minneapolis, MN (US); Jing Gui, Fremont, CA (US); Jorge V. Hanchi, Minneapolis, MN (US); Lance E. Stover, Eden Prairie, MN (US); Scott E. Ryun, Prior Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/357,406

(22) Filed: Jul. 20, 1999

Related U.S. Application Data
(60) Provisional application No. 60/093,745, filed on Jul. 21, 1998, and provisional application No. 60/102,719, filed on Sep. 28, 1998.

(51) Int. Cl.[7] .................................................. G11B 5/60
(52) U.S. Cl. ........................... 360/235.8; 360/236.1; 360/236.3; 360/236.6
(58) Field of Search ........................ 360/236.3, 235.8, 360/236.6, 237, 236.1, 236.8

(56) References Cited

U.S. PATENT DOCUMENTS

| | | | |
|---|---|---|---|
| 3,754,104 A | 8/1973 | Piper et al. | 179/100.2 |
| 4,034,412 A | 7/1977 | Smith | 360/103 |
| 4,212,044 A | 7/1980 | Plotto | 360/103 |
| 4,327,387 A | 4/1982 | Plotto | 360/103 |
| 4,420,780 A | * 12/1983 | Deckert | 360/122 |
| 4,553,184 A | 11/1985 | Ogishima | 360/103 |
| 4,636,894 A | 1/1987 | Mo | 360/103 |
| 4,646,180 A | 2/1987 | Ohtsubo | 360/103 |
| 4,692,832 A | 9/1987 | Bandara et al. | 360/137 |
| 4,757,402 A | 7/1988 | Mo | 360/103 |
| 4,802,042 A | 1/1989 | Strom | 360/103 |
| 4,853,810 A | 8/1989 | Pohl et al. | 360/103 |
| 4,901,185 A | 2/1990 | Kubo et al. | 360/104 |

(List continued on next page.)

FOREIGN PATENT DOCUMENTS

| | | |
|---|---|---|
| EP | 0 442 660 A2 | 8/1991 |
| JP | 54-23517 | 2/1979 |
| JP | 56-107363 | 8/1981 |

(List continued on next page.)

OTHER PUBLICATIONS

IBM TDD, Sep. 1991, vol. 34 iss #4B, pp. 158–160.*
Technical Disclosure Bulletin, "Magnetic Disk Storage System With Structured Magnetic Head Slider", by IBM Corp., vol. 27, No. 10A, (Mar. 1985) pp. 5820–5821.

(List continued on next page.)

Primary Examiner—Brian E. Miller
(74) Attorney, Agent, or Firm—Westman, Champlin & Kelly, P.A.

(57) ABSTRACT

A disc storage system includes a rotating disc and a transducer. The transducer is carried on a slider which is supported by an armature. The armature is used to move the slider radially across the disc surface whereby information may be read from or written to the disc surface of the transducer. The slider includes an air bearing surface which faces the disc surface. As the disc rotates, the air bearing surface causes the slider to "fly" over the disc surface. Pads are provided on the air bearing surface to improve operational characteristics of the system. For example, the pads may be used to reduce the stiction or improve flying characteristics. Flying instabilities associated with the pads are addressed by a number of characteristics provided to the air bearing surface.

36 Claims, 8 Drawing Sheets

U.S. PATENT DOCUMENTS

| | | | | |
|---|---|---|---|---|
| 4,961,121 | A | 10/1990 | Astheimer et al. | 360/103 |
| 5,010,429 | A | 4/1991 | Taguchi et al. | 360/103 |
| 5,012,572 | A | 5/1991 | Matsuzawa et al. | 29/603 |
| 5,020,213 | A | 6/1991 | Aronoff et al. | 29/603 |
| 5,021,906 | A * | 6/1991 | Chang et al. | 360/235.1 |
| 5,034,828 | A | 7/1991 | Ananth et al. | 360/75 |
| 5,052,099 | A | 10/1991 | Taguchi et al. | 29/603 |
| 5,063,712 | A | 11/1991 | Hamilton et al. | 51/67 |
| 5,067,037 | A | 11/1991 | Ananth et al. | 360/103 |
| 5,079,657 | A | 1/1992 | Aronoff et al. | 360/103 |
| 5,162,073 | A | 11/1992 | Aronoff et al. | 156/625 |
| 5,200,867 | A | 4/1993 | Albrecht et al. | 360/103 |
| 5,200,868 | A | 4/1993 | Chapin et al. | 360/103 |
| 5,202,803 | A | 4/1993 | Albrecht et al. | 360/97.02 |
| 5,231,613 | A * | 7/1993 | Nakayama et al. | 369/13 |
| 5,267,104 | A * | 11/1993 | Albrecht et al. | 360/97.02 |
| 5,285,337 | A | 2/1994 | Best et al. | 360/97.02 |
| 5,323,282 | A | 6/1994 | Kanai et al. | 360/103 |
| 5,345,353 | A | 9/1994 | Krantz et al. | 360/103 |
| 5,374,463 | A | 12/1994 | Bethune et al. | 428/64 |
| 5,386,666 | A | 2/1995 | Cole | 451/5 |
| 5,388,020 | A | 2/1995 | Nakamura et al. | 360/135 |
| 5,396,386 | A | 3/1995 | Bolasna et al. | 360/103 |
| 5,396,387 | A | 3/1995 | Murray | 360/103 |
| 5,418,667 | A | 5/1995 | Best et al. | 360/103 |
| 5,420,735 | A | 5/1995 | Haines | 360/103 |
| 5,424,888 | A | 6/1995 | Hendriks et al. | 360/103 |
| 5,453,315 | A | 9/1995 | Hamilton et al. | 428/209 |
| 5,490,027 | A | 2/1996 | Hamilton et al. | 360/104 |
| 5,499,149 | A | 3/1996 | Dovek | 360/103 |
| 5,508,861 | A | 4/1996 | Ananth et al. | 360/103 |
| 5,515,219 | A | 5/1996 | Ihrke et al. | 360/103 |
| 5,526,204 | A | 6/1996 | French et al. | 360/97.02 |
| 5,537,273 | A | 7/1996 | Hendriks et al. | 360/103 |
| 5,550,691 | A | 8/1996 | Hamiton | 360/103 |
| 5,550,693 | A | 8/1996 | Hendriks et al. | 360/103 |
| 5,550,696 | A | 8/1996 | Nguyen | 360/135 |
| 5,557,488 | A | 9/1996 | Hamilton et al. | 360/104 |
| 5,569,506 | A | 10/1996 | Jahnes et al. | 428/65.3 |
| 5,572,386 | A | 11/1996 | Ananth et al. | 360/103 |
| 5,606,476 | A | 2/1997 | Chang et al. | 360/103 |
| 5,612,838 | A | 3/1997 | Smith et al. | 360/102 |
| 5,625,512 | A | 4/1997 | Smith | 360/103 |
| 5,626,941 | A | 5/1997 | Ouano | 428/141 |
| 5,742,518 | A | 4/1998 | Gui et al. | 364/508 |
| 5,751,517 | A | 5/1998 | Agarwal | 360/103 |
| 5,768,055 | A * | 6/1998 | Tian et al. | 360/235.2 |
| 5,841,608 | A | 11/1998 | Kasamatsu et al. | 360/103 |
| 5,870,251 | A * | 2/1999 | Boutaghou | 360/103 |
| 5,982,583 | A * | 11/1999 | Strom | 360/103 |
| 5,991,118 | A * | 11/1999 | Kasamatsu et al. | 360/103 |
| 6,055,127 | A * | 4/2000 | Boutaghou et al. | 360/236 |
| 6,104,571 | A * | 8/2000 | Kabasawa | 360/103 |
| 6,160,683 | A * | 12/2000 | Boutaghou | 360/237.1 |
| 6,185,071 | B1 * | 2/2001 | Asanai et al. | 360/236.6 |
| 6,188,547 | B1 * | 2/2001 | Gui et al. | 360/236.5 |
| 6,195,235 | B1 * | 2/2001 | Boutaghou et al. | 360/235.2 |
| 6,212,042 | B1 * | 4/2001 | Gui et al. | 360/234.1 |
| 6,215,621 | B1 * | 4/2001 | Boutaghou | 360/236.6 |
| 6,236,543 | B1 * | 5/2001 | Han et al. | 360/236.6 |
| 6,304,418 | B1 * | 10/2001 | Boutaghou et al. | 360/236.6 |
| 6,330,131 | B1 * | 12/2001 | Nepela et al. | 360/234.5 |
| 6,392,842 | B1 * | 5/2002 | Boutaghou et al. | 360/236.6 |

FOREIGN PATENT DOCUMENTS

| | | | |
|---|---|---|---|
| JP | 58-66995 | | 4/1983 |
| JP | 59-193580 | | 11/1984 |
| JP | 61-204877 | | 9/1986 |
| JP | 63-231775 | | 9/1988 |
| JP | 1-116957 | | 5/1989 |
| JP | 1-227215 | | 9/1989 |
| JP | 4-28070 | * | 1/1992 |
| JP | 4-245054 | | 9/1992 |
| JP | 7-6538 | * | 1/1995 |
| JP | 7-21605 | * | 1/1995 |
| JP | 8-69674 | | 3/1996 |
| JP | 8-212740 | | 8/1996 |
| JP | 8-279132 | | 10/1996 |
| JP | 8-287440 | | 11/1996 |
| JP | 9-219077 | * | 8/1997 |

OTHER PUBLICATIONS

"Stiction Free Slider for the Smooth Surface Disk", by Y. Kasamatsu et al., *IEEE Transactions on Magnetics*, vol. 31, No. 6, (Nov. 1995), pp. 2961–2963.

"A Stiction Model for a Head–Disk Interface of a Rigid Disk Drive", by J. Gui et al., *J. Appl. Phys.*, vol. 78, No. 6, (Sep. 15, 1995), pp. 4206–4217.

"A Model for Mechanical Seals with Regular Microsurface Structure", by I. Etsion et al., *Tribology Transactions*, vol. 39, (1996), pp. 677–683.

"Increasing Mechanical Seals Life With Laser–Textured Seal Faces", by G. Halperin et al., *Surface Surtech Technologies Ltd.*, (Sep. 1997), pp. 1–12.

* cited by examiner

SLIDER FOR DISC STORAGE SYSTEM

The present invention claims priority to Provisional Application Serial No. 60/093,745, filed Jul. 21, 1998, entitled "METHODS OF REDUCING STICTION ON SLIDERS WITH LANDING PADS DUE TO SUBSTRATE/DISK CONTACT"; and Provisional Application Serial No. 60/102,719, filed Sep. 28, 1998, entitled "SUPER SLIDER FOR IMPROVED TRIBOLOGICAL PERFORMANCE AND STABILITY".

BACKGROUND OF THE INVENTION

The present invention relates to disc storage systems for storing information. More specifically, the present invention relates to sliders used in such systems.

Disc drives are used for storing information, typically as magnetically encoded data, and more recently as optically encoded data, on a disc surface. A transducing head is carried on a air-bearing slider that rides on a bearing of air above the disc surface as the disc rotates at high speed. In another technique, the slider contacts the disc surface with no air bearing interface such as is shown in U.S. Pat. Nos. 5,453,315 and 5,490,027. The head is then positioned radially over the disc to read back or write at a desired location. Benefits associated with an air bearing design are lost in such "contact" sliders.

In an air bearing design, the air bearing provides an interface between the slider and the disc which prevents damage to the disc over the life of the system, provides damping if the disc drive system undergoes shock due to external vibrations. The air bearing is also used to provide a desired spacing between the transducing element and the disc surface. A bias force is applied to the slider by a flexure armature in a direction toward the disc surface. This bias force is counteracted by lifting forces from the air bearing until an equilibrium is reached. The slider will contact the disc surface if the rotating speed of the disc is insufficient to cause the slider to "fly." This contact typically occurs during start up or shut down of the disc. If the slider contacts a region of the disc which carries data, the data may be lost and the disc permanently damaged.

In many disc drive systems, a lubricant is applied to the disc surface to reduce damage to the head and the disc surface during starting and stopping. Air or gas also acts as a lubricant. However, a phenomenon known as "stiction," which is caused by static friction and viscous shear forces, causes the slider to stick to the disc surface after periods of non use. The lubricant exacerbates the stiction problem. The stiction can damage the head or the disc when the slider is freed from the disc surface. Additionally, the spindle motor used to rotate the disc must provide sufficient torque to overcome the stiction.

One technique used to overcome the problem associated with stiction is to provide texturing to at least a portion of the disc surface. However, this reduces the effective recording area of the disc. Additionally, various attempts have been made to provide texturing on the air bearing surface of the slider. For example, U.S. Pat. Nos. 5,079,657 and 5,162,073 describes a technique for forming recesses in a slider surface. Another technique which is described in U.S. Pat. No. 5,418,667 includes providing large pads which provide a pitch to the slider to allow air flow between the air bearing surface and the disc.

SUMMARY OF THE INVENTION

A disc storage system includes a rotating disc and a transducer. The transducer is carried on a slider which is supported by an armature. The armature is used to move the slider radially across the disc surface whereby information may be read from or written to the disc surface of the transducer. The slider includes an air bearing surface which faces the disc surface. As the disc rotates, the air bearing surface causes the slider to "fly" over the disc surface. Pads are provided on the air bearing surface to improve operational characteristics of the system. For example, the pads may be used to reduce the stiction or improve flying characteristics. Flying instabilities associated with the pads are addressed by a number of characteristics which are provided to the air bearing surface.

DETAILED DESCRIPTION OF THE PREFERRED EMBODIMENTS

Figure 1:
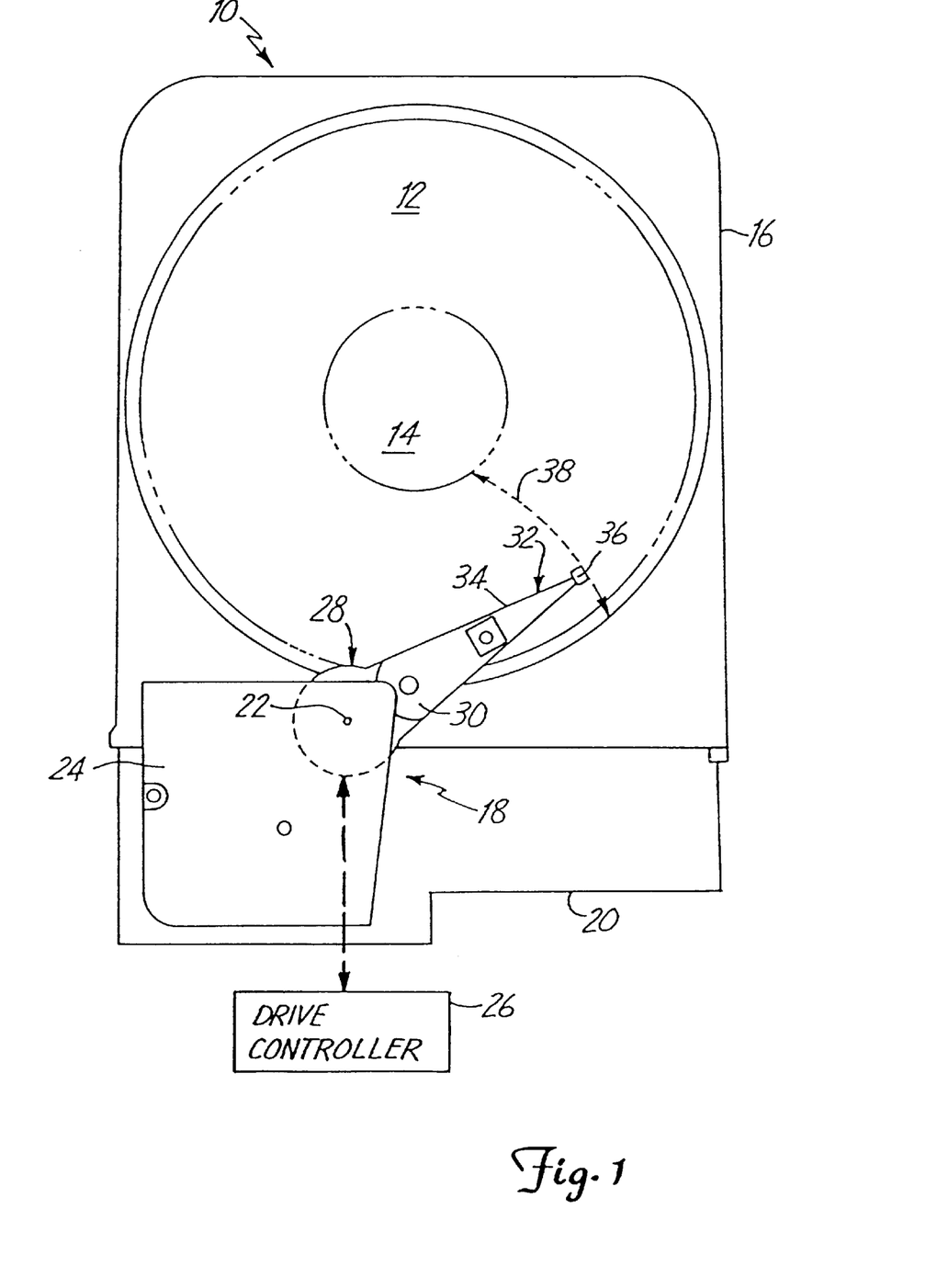
FIG. 1 is a simplified diagram of a storage system in accordance with the present invention.

FIG. 1 is a top view of a disc drive 10 including a slider in accordance with the present invention. Disc drive 10 includes a magnetic disc 12 mounted for rotational movement about and axis defined by spindle 14 within housing 16. Disc drive 10 also includes an actuator 18 mounted to a base plate 20 of housing 16 and pivotally moveable relative to disc 14 about axis 22. A cover 24 covers a portion of actuator 18. Drive controller 26 is coupled to actuator 18. In the preferred embodiment, drive controller 26 is either mountable within disc drive 10, or is located outside of disc drive 10 with suitable connection to actuator 18. Actuator 18, includes an actuator arm assembly 28, a rigid support member 30, and a head gimbal assembly 32. Head gimbal assembly 32 includes a load beam or flexure arm 34 coupled to rigid member 30, and a slider 36 coupled by a gimbal (not shown) to load beam 34. Slider 36 operates in accordance with the embodiments set forth herein and supports a transducer for reading information from and encoding information on disc 12.

During operation, drive controller 26 receives position information indicating a portion of disc 12 to be accessed. Drive controller 26 receives the position information from an operator, from a host computer, or from another suitable controller. Based on the position information, drive controller 26 provides a position signal to actuator 18. The position signal causes actuator 18 to pivot about axis 22. This, in turn, causes actuator 18 to pivot about axis 22. This, in turn, causes slider 36 (and consequently the transducer mounted on slider 36) to move radially over the surface of disc 12 in a generally arcuaic path indicated by arrow 38. Drive controller 26 and actuator 18 operate in a known closed loop, negative feedback manner so that the transducer carried by slider 36 is positioned over the desired portion of disc 12. Once the transducer is appropriately positioned, drive controller 26 then executes a desired read or write operation.

Recording density can be increased by reducing the fly height of slider 36. Close proximity of slider 36 with disc 12 allows greater accuracy in reading and writing information onto disc 12.

Stiction and fly/stiction are two major phenomena that impair the use of ultra-low flying recording heads to increase recording areal density. The solution to these problems has been to generate, in a controlled fashion, some asperities, or texture, on the media surface to reduce the area of contact at the head-media interface. The presence of these asperities on the media surface, although they can be confined to only within a small dedicated zone (i.e., a "landing zone"), enhances the chance of head-media contact during operation and thereby sets the limit to the true attainment of ultra-low flying. In most cases, due to the shape of the asperity, the nature of contact is called Hertzian contact, in which elastic deformation can occur locally. Consequently, the number of asperities on the media surface to support the head cannot be arbitrarily reduced, otherwise the interface will collapse leading to excessive stiction. In addition, this type of contact is prone to collapsing when an excessive amount of liquid lubricants are present in the interface. For example, the lubricant applied on the media to prevent wear during head-disc contact, as well as other outgassing materials from various drive components, may accumulate on the heads, and transfer to the interface thereby leading to excessive fly/stiction.

One technique to address these issues is the use of small column-like texture features, i.e., landing pads, on the air bearing surface of a flying head to control stiction. Sliders with such landing pads can be used on substantially smooth discs. The use of such pad is described in U.S. patent application Ser. No. 09/029,276, filed Dec. 9, 1998, entitled "SLIDER FOR DISC STORAGE SYSTEM" which is incorporated herein by reference.

Figure 2A:
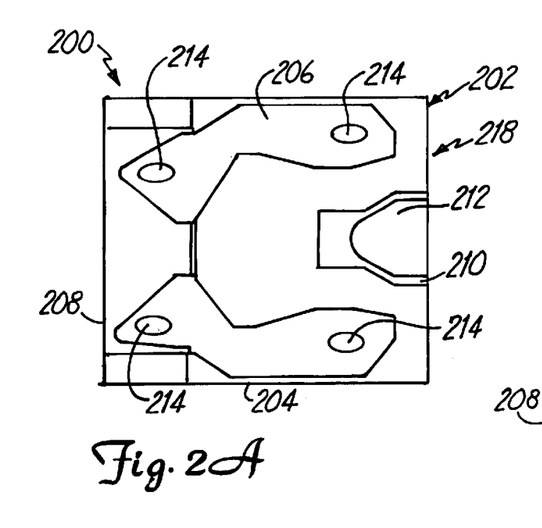
FIGS. 2A and 2B are bottom plan views of a slider including landing pads.
Figure 2B:
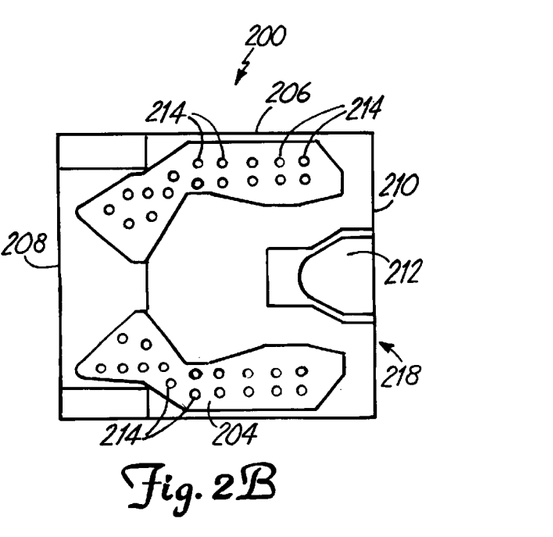

FIGS. 2A and 2B are bottom plan views of sliders 200. Similar elements have been numbered the same. Slider 200 includes a slider body 202 having rails 204 and 206 extending between a leading edge 208 and a trailing edge 210. A center island 212 is positioned on trailing edge 210. In slider 200 of FIG. 2A includes four pads 214 positioned on rails 204 and 206. In the embodiment of FIG. 2B, slider 200 includes multiple pads 216 positioned on rails 204 and 206.

The use of the pads on the air bearing surface of the slider reduces the area of contact and thus reduces the stiction/friction when contacting a very smooth storage medium. Typically, the landing pads have heights on the order to 200 nm to 700 nm and are attached to the air bearing surface shown generally at 218. To avoid contact during flying, the pads are typically positioned 254 $\mu$m away from trailing edge 210. However, this geometry creates instabilities under both dynamic and static conditions. For example, under static conditions when the slider stops on the disc it has a tendency to tip due to back rotation of the motor which drive spindle 14. This causes contact of the trailing edge 210 and wear of the rear pads occurs. Further, during wear of the slider pads, the slider body may tip.

Figure 3:
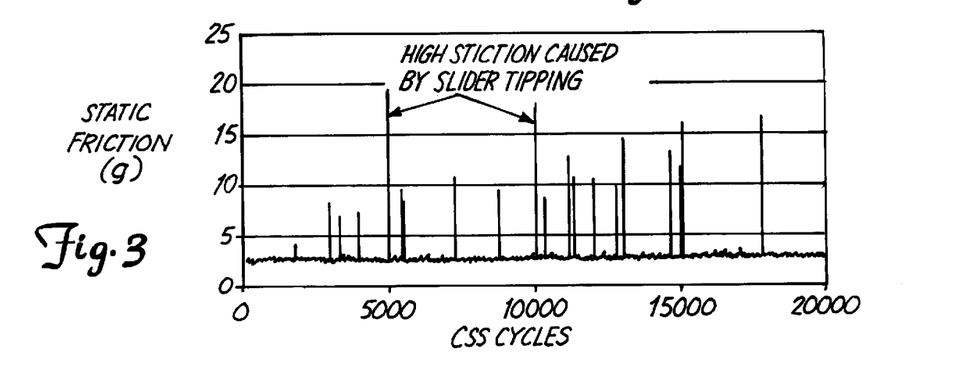
FIG. 3 is a graph of static friction versus contact start/stop (CSS) cycles.
Figure 4:
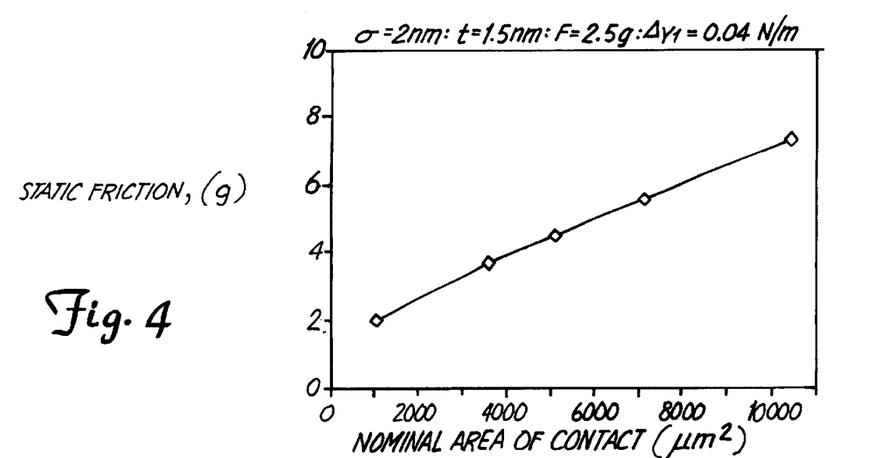
FIG. 4 is a graph of static friction versus nominal area of contact.

An approximate calculation shows that when the slider tips backwards, the area of contact increases by approximately an order of magnitude and thus the friction also increases by an order of magnitude. This pseudo-linear dependence of friction to the nominal area of contact has been observed experimentally as illustrated in FIG. 2 which is a graph of static friction versus contact start/stop (CSS). This is also predicted using a friction model as described in Polycarpou, AA., Etison, I., 1998, "Static Friction of Contacting Real Surfaces in the Presence of Sub-Boundary Lubrication," ASME Journal of Tribology, Vol. 120, pp. 296–303. The prediction of this model is illustrated in FIG. 4 which is a graph of static friction versus nominal area of contact. This model is an alternative to meniscus stiction models and is more accurate for strong lubricant solid bond, very thin lubricants typically used at the head/disc interface. The static friction coefficient $\mu$ is written as:

$$\mu = \frac{Q}{F} = \frac{Q}{P - F_S} 1 \qquad \text{Equation 1}$$

where Q, F, P and $F_S$ are the friction, preload, contact and adhesion forces, respectively. The surfaces are modeled with a surface roughness model that allows for elastic-plastic deformation of the asperities. The model depends on the preload and nominal area contact, surface roughness (standard deviation of asperity heights related to $R_a$, radius of curvature of asperity heights, areal density of asperities, and the distribution of asperity heights. It also depends on the material properties (hardness, elastic modulus of elasticity, and Poisson's ratio), and the lubricant properties of energy of adhesion (surface free energy), intermolecular spacing, and the lubricant thickness.

Figure 5:
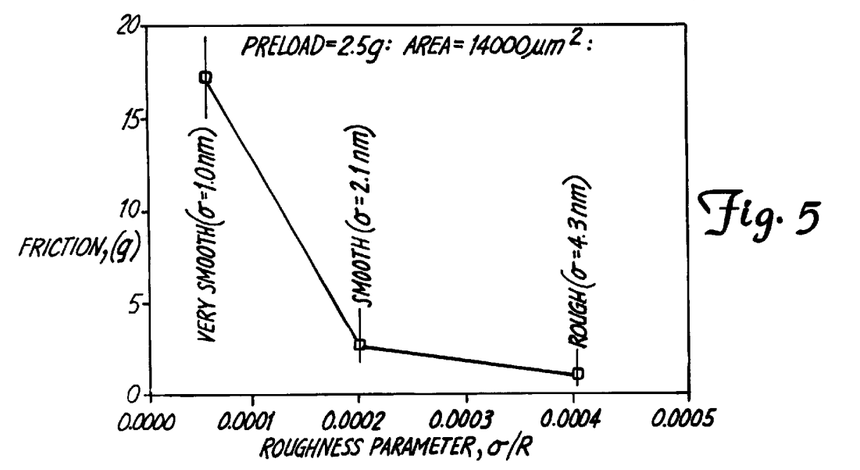
FIG. 5 is a graph of friction versus roughness.

The friction is strongly and non-linearly dependent upon the roughness, as observed experimentally and also as predicted by the above model. FIG. 5 is a graph of friction versus the roughness parameter $\sigma/R$ which shows the effect of roughness on friction for rough, smooth and very smooth surfaces.

Another phenomenon that may take place during the tipping of a slider is the migration of the mobile lubricant present at the interface. This can form large menisci and thereby increase stiction. Another phenomenon is the contact of the outer radius and/or the inner radius of the slider either during flying or during static conditions. The net effect of this contact is an increase in the contact area, and thereby an increase in the stiction/friction. Such large increases in stiction are catastrophic for the head/disc interface causing the head to stick and crash on the media.

Figure 6:
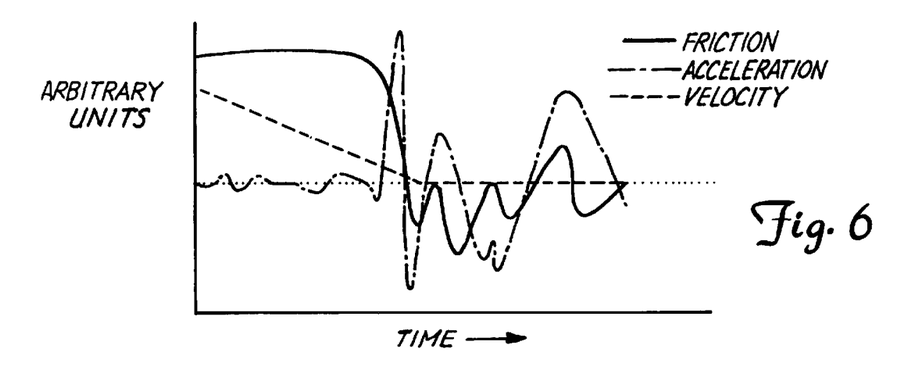
FIG. 6 is a graph showing friction, acceleration and velocity of a slider versus time.

Both dynamic and static interaction of the slider and the media cause the unstable behavior and tipping of the slider. In dynamic interaction, when the slider comes to a stop and transitions from sliding to sticking, the friction force (or tangential force) typically oscillates at a system resonance indicating that the slider is experiencing some form of rocking and translational motion. This is shown graphically in FIG. 6. In FIG. 6, the dotted line is the velocity as the slider moves from sliding to sticking (0 velocity). The thick solid line is a graph of the friction force showing that as the velocity goes to zero, the friction also drops to zero and moves through negative values thereby fluctuating. The thinner solid line is a graph of tangential acceleration of the slider which indicates that the transition from sliding to sticking is abrupt and the slider oscillates after it comes to a stop. During such oscillations, the slider air bearing surface and the center pad will contact the media. Static geometrical analysis indicates that even 500 microradians of tilt of the slider is sufficient to cause contact at the trailing edge of the slider.

Further, typically drive spindles in disc drive systems experience a backlash when coming to a stop and before they start to spin. As these backward motions are usually very small, and because the friction at the landing pads is sufficiently high, sliding does not occur in the slider tips.

The increased area of contact (in addition to the area from the landing pad) and not the increased friction may also be caused from wearing of the landing pads or from built in variations from the geometry of the slider such as crown and cross curved.

Thus, although such slider designs have reduced stiction, the complex nature of the air bearing surface including landing pads, curvatures, preload offsets, and stringent flying requirements such as pitch, roll, etc. lead to instabilities under both static and dynamic conditions or during the wearing in of the pads.

Figure 7A:
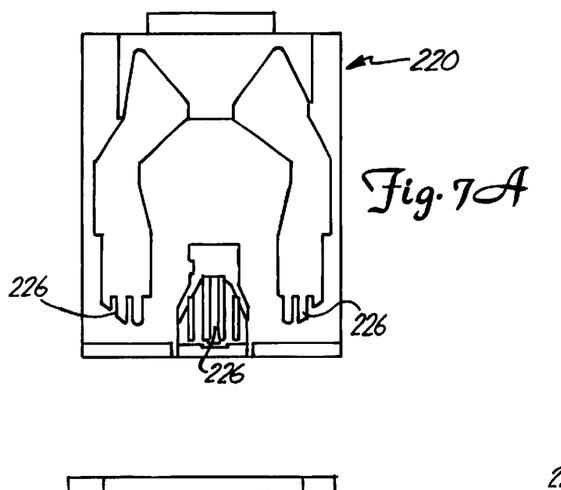
FIGS. 7A, 7B and 7C are bottom plan view of sliders showing trenches formed near their trailing edge.
Figure 7B:
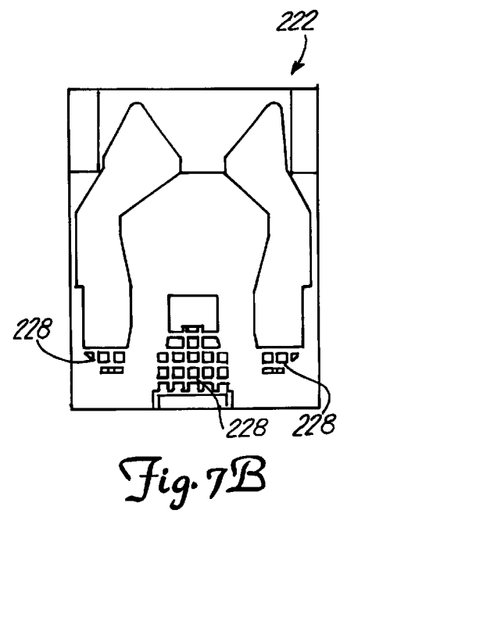
Figure 7C:
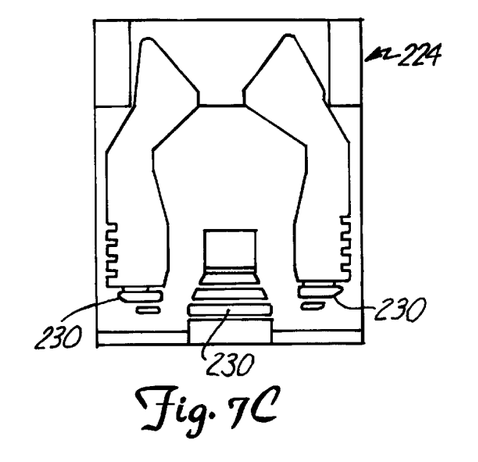

One technique used to reduce the area of possible contact and prevent the migration of mobile lubricants is the use of trenches as illustrated in FIGS. 7A, 7B and 7C. Sliders 220, 222 and 224 include trenches 226, 228 and 230, respectively which are positioned closer to the trailing edge of the slider. The trenches may be in any direction including horizontal, vertical or crosswise as illustrated in FIG. 7B. All three designs achieve a reduction in stiction values. However, the reduction in stiction is only about 50%, from 30 grams to between about 10 and 15 grams. Additionally, significant wear is observed near the trenches.

Another technique to reduce slider tipping is by "roughening" portions of the air bearing surface. Any portion of the air bearing surface including the center pad and side rails can be roughened using appropriate techniques. In one technique, the surface is coated with diamond-like carbon (DLC) for corrosion protection and the TiC is chemically etched. This can increase the Ra value of the air bearing surface from 2 nm to 9 nm. Further roughening can cause pitting of the air bearing surface. The roughening decreases friction and the contact area is reduced due to the pitting. These pits act as potential locations for storing wear debris and they also increase the positive pressure into additional aerodynamic effects. Another roughening technique is a short duration ion milling. After the air bearing surface has been lapped, an ion beam is applied to achieve a milling depth of around 0.3 $\mu$m providing an Ra value change from 1 nm to between 10 and 50 nm. Assuming a square root relationship between ion milling time and milling depth, a three minute ion milling time produces a roughness Ra value of 6.0 nm.

Figure 8A:
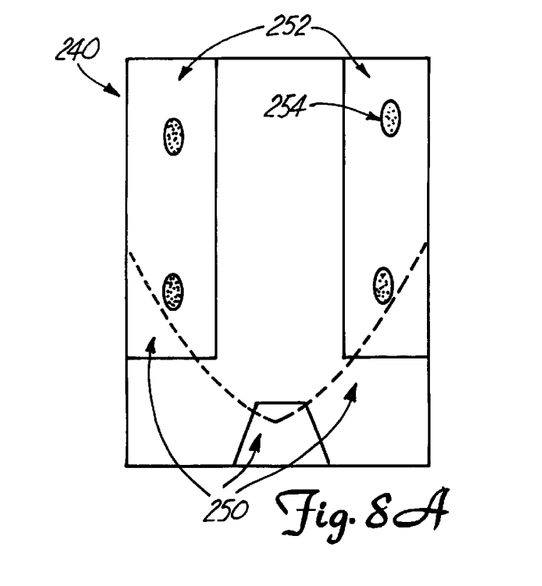
FIGS. 8A, 8B, 8C and 8D are bottom plan views of sliders showing various roughened areas.
Figure 8B:
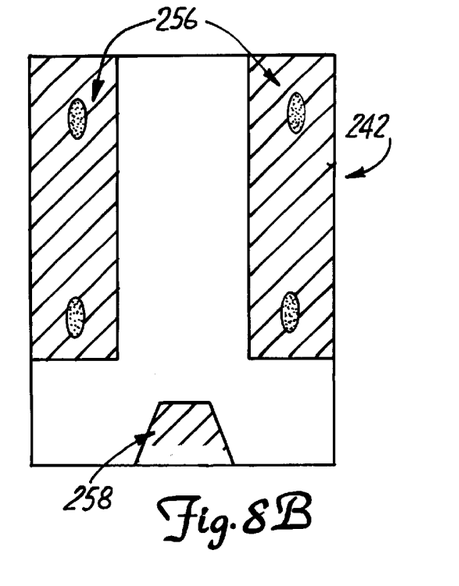
Figure 8C:
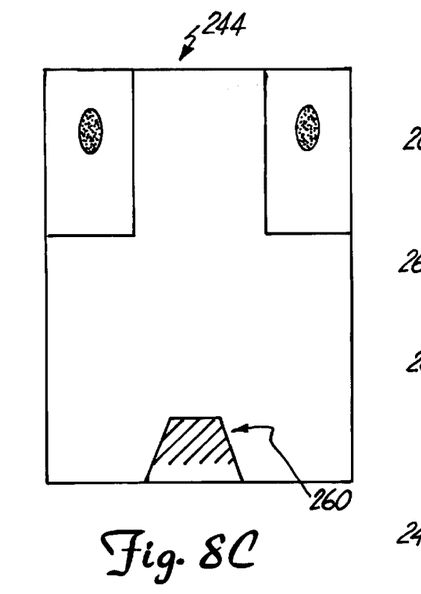
Figure 8D:
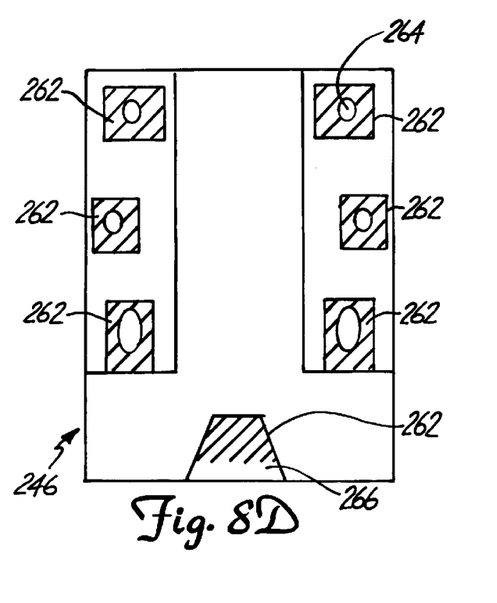

FIGS. 8A, 8B, 8C and 8D are bottom plan views of sliders 240, 242, 244 and 246, respectively, showing various "roughened" areas. In FIG. 8A, a roughened area 250 is positioned near the trailing edge of the slider. The majority of rails 252 are not roughened and carry landing pads 254. In FIG. 8B, rails 256 and center pad 258 are roughened everywhere. However, in FIG. 8C, only center pad 260 has been roughened. FIG. 8D illustrates a slider 246 in which roughened areas 262 are positioned near landing pads 264. Additionally, center island 266 also contains a roughened region 262. The roughened regions are merely provided as examples for illustrating the invention.

Figure 9A:
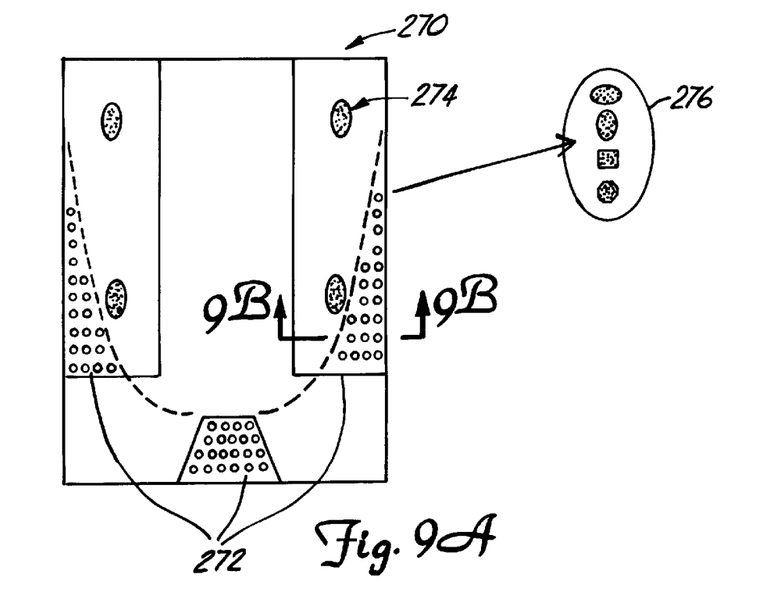
FIG. 9A is a bottom plan view of a slider having micro pores formed therein.
Figure 9B:
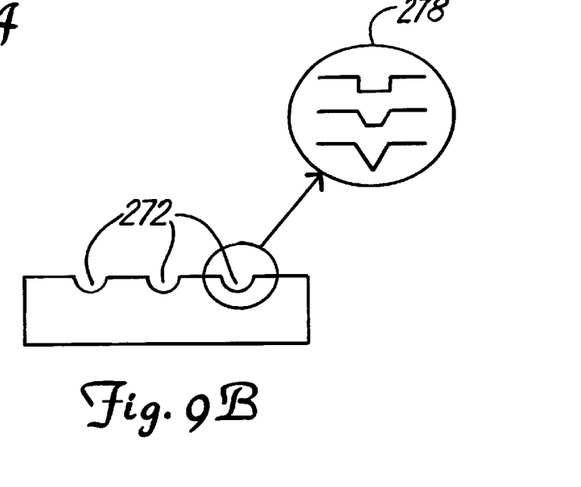
FIG. 9B is a cross-sectional view taken along the line labeled 9B—9B of FIG. 9A showing the micro pores of FIG. 9A.
Figure 9C:
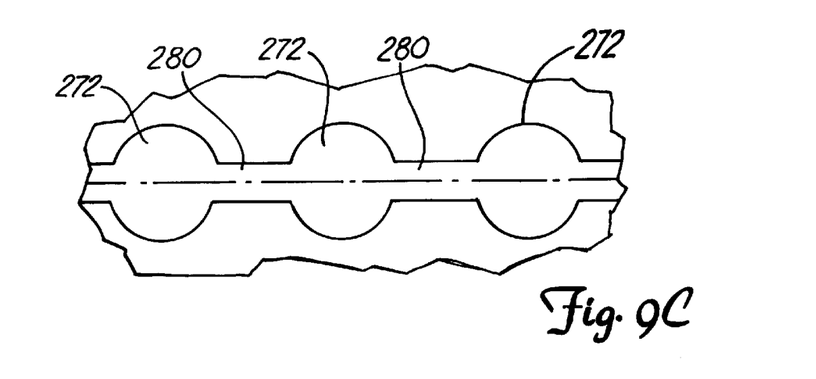
FIG. 9C is a plan view of micro pores connected by channels.

In addition to roughening areas of the air bearing surface, small holes, or "micro pores" can be used on the surface. FIG. 9A is a bottom plan view of a slider 270 including micro pores 272 carried on side rails and the center island of the slider 270. Pads 274 are also carried on the rails. The micro pores reduce the area of contact and thus reduce the stiction and friction. Further, the micro pores have aerodynamic properties which contribute to the lift of the air bearing surface. This reduces contact force and thereby reduces friction and wear. The shape and size of micro pores can vary as desired to achieve optimal load carrying capacities. Example shapes of the micro pores are illustrated in the inset 276. FIG. 9B is a side cross-sectional view of a portion of the side rail of FIG. 9A taken along the line 9B—9B. The cross-sectional shape of the micro pores can vary as desired. Several different shapes are illustrated in inset 278. FIG. 9C shows a close up of a portion of the air bearing surface of the slider 270 of FIG. 9A. In the embodiment of FIG. 9C, the micro pores are connected by channels 280 which reduces the trapping of any lubricant or debris in the micro pores. This reduces the migration of lubricant which may take place during stopping of the slider which is known to lead to increased friction.

Figure 10:
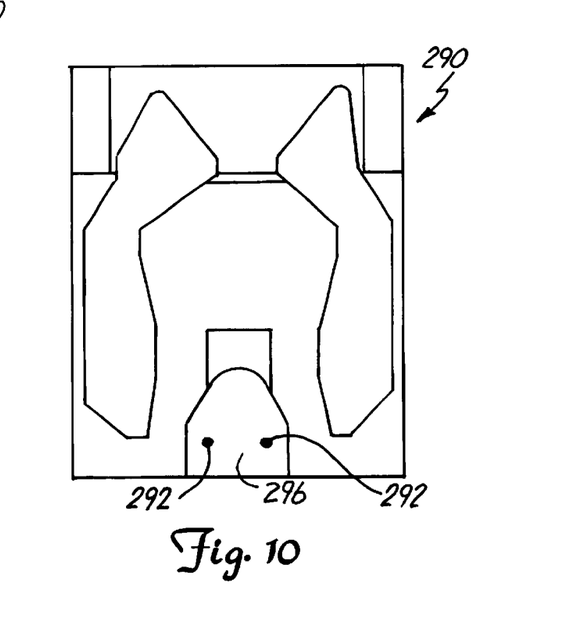
FIG. 10 is a bottom plan view of a slider which includes side kick features.

FIG. 10 is a bottom plan view of slider 290 in which "side kicks" 292 are positioned on center island 296. The side kicks 292 are small pads, for example, small diamond-like carbon bumps which reduce tipping of the slider 290. However, if the slider is not flying optimally due to high roll or if the slider is flying too low, or if the geometry of the slider is incorrect such as the crown or camber being out of specification, the side kick pads 292 are quickly worn off and the very smooth air bearing surface comes into direct contact with the disc surface leading to high stiction.

Figure 11A:
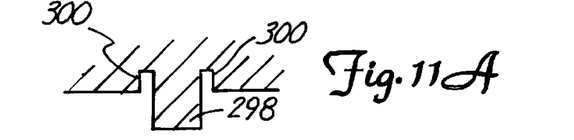
FIGS. 11A and 11B are side cross-sectional and plan views, respectively, of a landing pad with a trench.
Figure 11B:
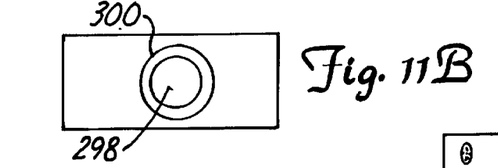

FIG. 11A is a side cross-sectional view and FIG. 11B is a bottom plan view showing pad 298 with a moat or a trench 300 extending around the pad 298. The moat 300 acts to reduce stiction by reducing the gross menisci which is formed around pad 298.

Another technique to reduce stiction is to provide the slider with a high crown. For example, crowns greater than 1 $\mu$in and preferably about 1.5 $\mu$in offer reduced stiction, even if the slider tips. This reduction in stiction is due to the smaller area that contacts the media.

In one aspect of the present invention, some or all of the aforementioned techniques are combined to provide a slider with superior tribological properties which is substantially insensitive to geometrical variations, contaminants, lube thickness variation and media type for both textured or polished media. Preferably, the slider is insensitive to very smooth media (Ra less than 5 Å) which is particularly desirable for high aerial recording densities and low fly heights.

Figure 12A:
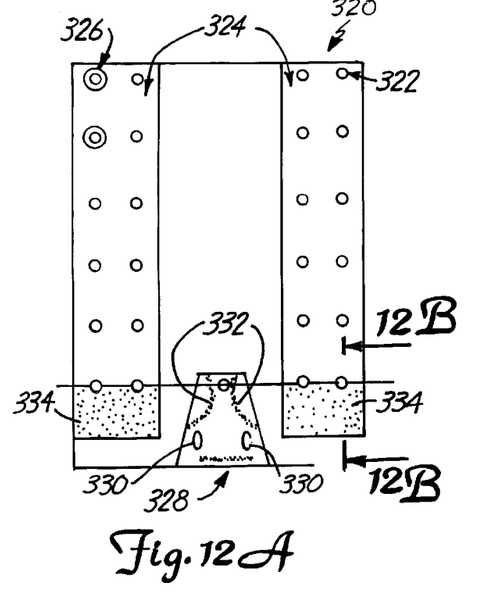
FIG. 12A is a bottom plan view of a slider showing various features in accordance with the present invention to reduce the occurrence and the effects of tipping.
Figure 12B:
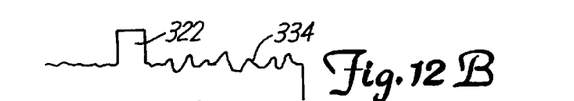
FIGS. 12B and 12C are side cross-sectional views taken along the lines labeled 12B—12B of FIG. 12A showing portions of a rail of the slider of FIG. 12A.
Figure 12C:
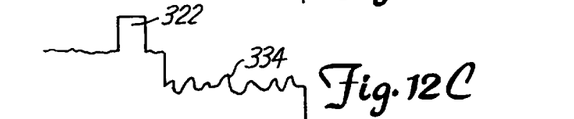

In FIG. 12A a slider 320 which includes diamond-like carbon pads 322 carried on rail 324. Some or all of the pads 322 include trenches 325 which surround their base to reduce meniscus formation. The number of landing pads and their locations can vary depending upon the specific air bearings type and shape, the geometry of the slider and the load that the slider needs to carry. The diamond-like carbon pads are preferably spaced away from the trailing edge of the slider such that there is no interference or contact with the media. However, this effect increases the propensity of slider 320 for tipping, especially during starting and stopping of the slider. When slider 320 tips, a large area of the smooth air bearing surface and center pad 328 come into contact with the smooth media causing a significant increase in the stiction due to the increase in the adhesive and meniscus forces. Prolonged high stiction can lead to excessive wear of the pads and cause crashes of slider 320. In order to reduce tipping, side kicks 330 made of shorter diamond-like carbon pads (between about 100 and about 300 Å) are placed on center rail 328 to reduce slider tipping during start up and stopping. Further, slider 320 has a relatively large crown which minimizes the effects of tipping by preventing a large contact area between slider 320 and media surface. In the embodiment shown, there are two side kicks 330. Additionally, the shape of side kicks 330 can be selected as appropriate for various air bearing designs such as using round pads, oval pads or long thin pads which may provide advantageous air bearing effects. Additionally, trenches 332 are provided on center pads 328 to further reduce the contact area should tipping occur. Trenches 332 also provide paths for drainage of lubricant such that lubricant does not concentrate on center island 328 which could cause high stiction. Roughened areas 334 are provided near the trailing edge of rails 324 of slider 320 to prevent high stiction. FIG. 12B is a cross-sectional view of slider 320 taken along the line labeled 12B—12B. As illustrated in FIG. 12B, the mean plane of the roughened portion 334 can be parallel with the plane of the smooth portion of rail 324. In another embodiment as illustrated in FIG. 12C, the mean plane of roughened area 334 is recessed from the rest of rail 324. This can be achieved through ion milling or etching techniques as are known in the art. By recessing the roughened areas 334, greater distances provided between the trailing edge of slider 320 and the media to further reduce the effects of tipping. This also allows reduced flying which will increase the control or stiffness of the air bearing which is particularly useful in proximity recording application.

Figure 13:
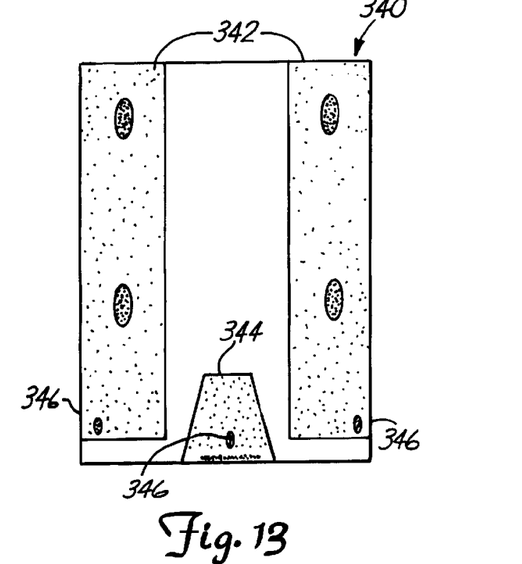
FIGS. 13, 14, 15, 16 and 17 are bottom plan views of sliders showing various embodiments of the present invention.

FIG. 13 is a bottom plan view of a slider 340 in which the entire surface of rails 342 is roughened as is center island 344. Small kick pads 346 are defined at the trailing edge of rails 342 and on center island 344.

Figure 14:
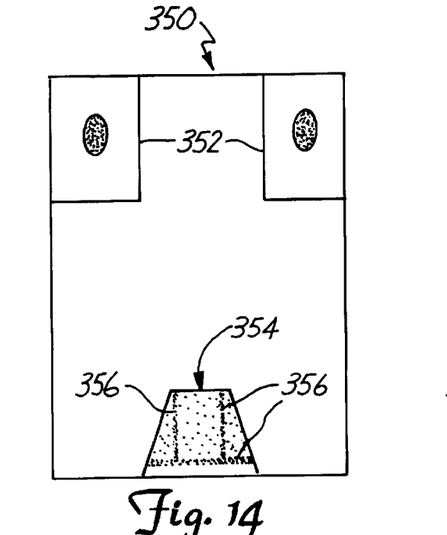
Figure 15:
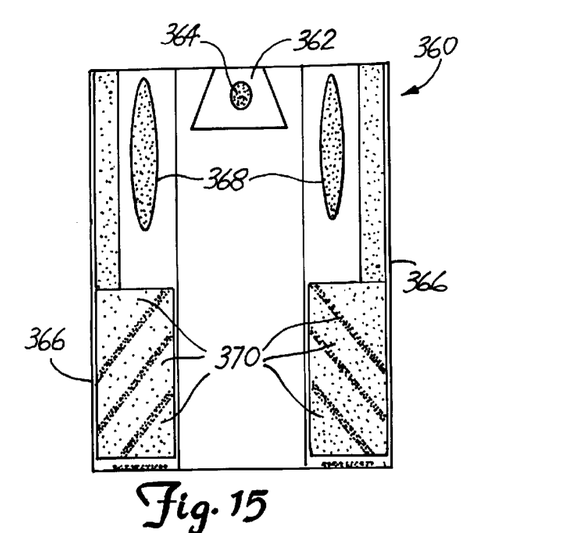

FIG. 14 is a bottom plan view of a slider 350 having short rails 352 and a center island 254 which is substantially entirely roughened. Trenches 356 are also defined in center island 354. In the embodiment of FIG. 15, a slider 360 is shown in which a center island 362 positioned near the leading edge of the slider carries a bump, such as a DLC bump 364. Rails 366 include skids or bumps 368. All or part of the rails 366 is roughened as illustrated in FIG. 15. Further, trenches 370 are formed in rails 366. In the embodiment shown, the trenches are positioned near the trailing edge of the slider and extend in a generally diagonal direction relative to the direction of sliding.

Figure 16:
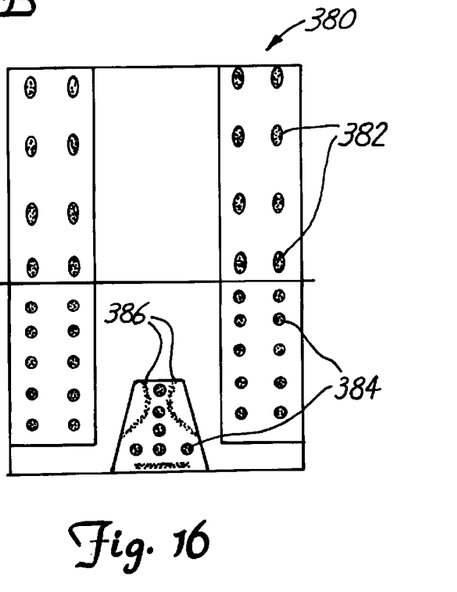

In FIG. 16, a slider 380 is shown in which leading edge pads 382 have a height which is greater than trailing edge pads 384. Additionally, trenches 386 are provided on the center island. The short trailing edge pads act as multiple side kick features.

Figure 17:
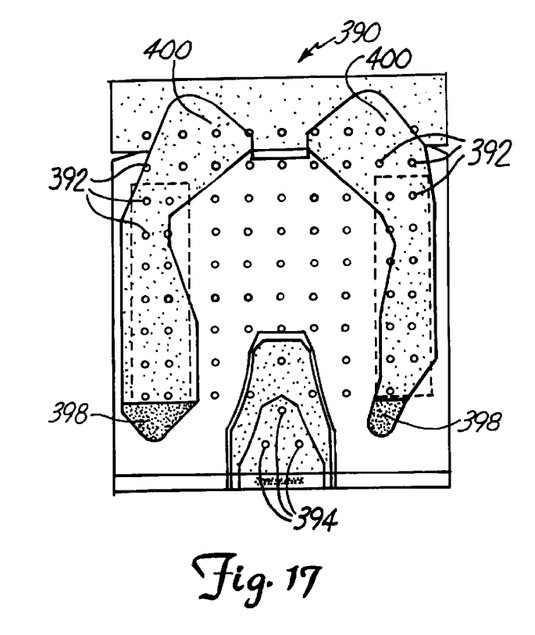
Figure 18:
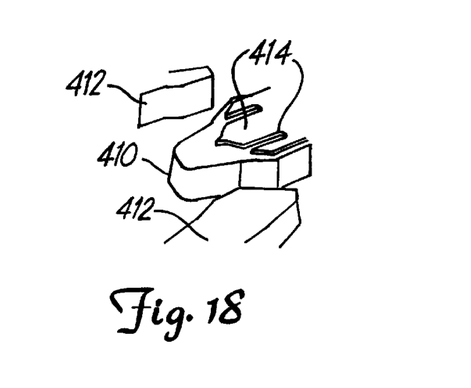
FIG. 18 is a perspective view showing a center island of a slider which includes trenches formed therein.

FIG. 17 is a bottom plan view of a slider 390 using DLC bumps 392 and side kick features 394. In the embodiment shown, bumps 392 cover substantially the entire air bearing surface. This is due to the particular masking technique used to fabricate bumps 392. The bumps in the recessed portions of the air bearing surface generally have no effect and can be eliminated. Roughened portions 398 are provided at the trailing edge of rails 400. Preferably, the air bearing surface of slider 390 has a high crown. FIG. 18 is a perspective view of a portion of a slider showing center island 410 and the trailing edge of rails 412. Center island 410 includes vertical trenches 414 formed therein.

Although the present invention has been described with reference to preferred embodiments, workers skilled in the art will recognize that changes may be made in form and detail without departing from the spirit and scope of the invention. In general, the pads may be placed along any protruding portion of the air bearing surface such as the side rails, a center rail, a center island, etc. In general, the present invention includes all of the various sizes, shapes, heights, placings, configurations, densities, etc. of the pads set forth herein. Such pads may be made in accordance with any of the processes set forth herein or may be fabricated using other processes as desired. Similarly, the specific process herein are not limited to fabrication of those pads which have been specifically set forth herein. The invention may be used with any type of transducing element including inductive, magnetoresistive and optical elements. In general, in these designs the pads only contact the disc surface during CSS and do not contact the disc surface during normal flying. As used herein, a "textured portion" or "texture" means any configuration of the air bearing surface in which features have been added in order to have a desired aerodynamic effect.

What is claimed is:

1. A disc drive storage system, comprising:

a rotating disc having a disc surface;

a transducer head adapted to read and write on the disc surface;

transducer circuitry coupled to the transducer head;

a slider having rails formed thereon and having an air bearing surface, the slider supporting the transducer head proximate the disc surface;

a plurality of pads carried on the rails having areas which contact the disc surface during contact start/stop (CSS), the plurality of pads causing instability and degraded flying characteristics of the slider; and wherein the air bearing surface has a textured portion having at least a portion spaced from the plurality of pads and is disposed proximate a trailing edge of the slider to improve flying characteristics and stability of the slider and counter act degraded flying characteristics and instability caused by the plurality of pads.

2. The disc drive storage system of claim 1 wherein the textured portion comprises trenches configured to reduce the area of potential contact between the air bearing surface and the disc and reduce the migration of mobile lubricants.

3. The disc drive storage system of claim 1 wherein the textured portion comprises a roughened surface of the air bearing surface.

4. The disc drive storage system of claim 1 wherein the textured portion includes micro pores in the air bearing surface to reduce the potential area of contact between the air bearing surface and the disc surface.

5. The disc drive storage system of claim 4 including at least one channel extending between two micro pores to thereby reduce trapping of debris or lubricant in the micro pores.

6. The disc drive storage system of claim 1 including at least one side kick pad positioned adjacent the trailing edge of the slider to prevent tipping of the slider.

7. The disc drive storage system of claim 1 including a trench which extends around a base periphery of at least one of the plurality of pads to thereby reduce gross menisci formation around the pad.

8. The disc drive storage system of claim 1 wherein the air bearing surface has a profile with a crown which is greater than about 1 μin.

9. The disc drive storage system of claim 1 wherein the textured portion comprises a roughened area substantially coplanar with a plane of the air bearing surface.

10. The disc drive storage system of claim 1 wherein the textured portion comprises a roughened area recessed from a plane of the air bearing surface.

11. The disc drive storage system of claim 1 wherein the textured portion comprises trenches configured to reduce the area of potential contact between the air bearing surface and the disc and reduce the migration of mobile lubricants and wherein the air bearing surface has a profile with a crown which is greater than about 1 μin.

12. The disc drive storage system of claim 11 including a trench which extends around a base periphery of at least one of the plurality of pads to thereby reduce gross menisci formation around the pad.

13. The disc drive storage system of claim 1 wherein the air bearing surface includes first and second rails and a center island and the textured portion covers substantially all of the first and second rails and center island.

14. The disc drive storage system of claim 13 including a trench which extends around a base periphery of at least one of the plurality of pads to thereby reduce gross menisci formation around the pad.

15. The disc drive storage system of claim 1 wherein the slider includes a center island and the textured portion of the air bearing surface covers substantially all of the center island, the center island further including trenches configured to reduce the area of potential contact between the air bearing surface and the disc and reduce the migration of mobile lubricants.

16. The disc drive storage system of claim 1 wherein the textured portion comprises trenches configured to reduce the area of potential contact between the air bearing surface and the disc and reduce the migration of mobile lubricants, a roughened surface proximate at least one of the plurality of pads, a trench which extends around a base periphery of at least one of the plurality of pads to thereby reduce gross menisci formation around the pad, and at least one side kick pad positioned adjacent the trailing edge of the slider to prevent tipping of the slider.

17. The disc drive storage system of claim 1 wherein the trenches extend in a direction which is generally diagonal to a direction of the slider.

18. A disc drive storage system, comprising:
 a rotating disc having a disc surface;
 a transducer head adapted to read and write on the disc surface;
 transducer circuitry coupled to the transducer head;
 a slider having a center island and rails formed thereon and having an air bearing surface, the slider supporting the transducer head proximate the disc surface;
 a plurality of pads carried on the rails having areas which contact the disc surface during contact start/stop (CSS); and
 wherein the air bearing surface has a textured portion having at least a portion disposed on the center island of the slider to reduce stiction when the slider is tipped.

19. The disc drive storage system of claim 18, wherein the center island is disposed adjacent a trailing edge of the slider.

20. The disc drive storage system of claim 18 wherein the textured portion comprises trenches configured to reduce the area of potential contact between the air bearing surface and the disc and reduce the migration of mobile lubricants.

21. The disc drive storage system of claim 18 wherein the textured portion comprises a roughened surface of the air bearing surface.

22. The disc drive storage system of claim 21 wherein the roughened surface is proximate at least one of the plurality of pads.

23. The disc drive storage system of claim 18 wherein the textured portion includes micro pores in the air bearing surface to reduce the potential area of contact between the air bearing surface and the disc surface.

24. The disc drive storage system of claim 23 including at least one channel extending between two micro pores to thereby reduce trapping of debris or lubricant in the micro pores.

25. The disc drive storage system of claim 18 including at least one side kick pad positioned on the center island of the slider.

26. The disc drive storage system of claim 18 including a trench which extends around a base periphery of at least one of the plurality of pads to thereby reduce gross menisci formation around the pad.

27. The disc drive storage system of claim 18 wherein the air bearing surface has a profile with a crown which is greater than about 1 μin.

28. The disc drive storage system of claim 18 wherein the textured portion comprises a roughened area substantially coplanar with a plane of the air bearing surface.

29. The disc drive storage system of claim 18 wherein the textured portion comprises a roughened area recessed from a plane of the air bearing surface.

30. The disc drive storage system of claim 18 wherein the textured portion comprises trenches configured to reduce the area of potential contact between the air bearing surface and the disc and reduce the migration of mobile lubricants and wherein the air bearing surface has a profile with a crown which is greater than about 1 μin.

31. The disc drive storage system of claim 30 including a trench which extends around a base periphery of at least one of the plurality of pads to thereby reduce gross menisci formation around the pad.

32. The disc drive storage system of claim 18 wherein the textured portion covers substantially all of the first and second rails and center island.

33. The disc drive storage system of claim 32 including a trench which extends around a base periphery of at least one of the plurality of pads to thereby reduce gross menisci formation around the pad.

34. The disc drive storage system of claim 18 wherein the slider includes a center island and the textured portion of the air bearing surface covers substantially all of the center island, the center island further including trenches configured to reduce the area of potential contact between the air bearing surface and the disc and reduce the migration of mobile lubricants.

35. The disc drive storage system of claim 18 wherein the textured portion comprises trenches configured to reduce the area of potential contact between the air bearing surface and the disc and reduce the migration of mobile lubricants, a roughened surface proximate at least one of the plurality of pads, a trench which extends around a base periphery of at least one of the plurality of pads to thereby reduce gross menisci formation around the pad, and at least one side kick pad positioned adjacent the trailing edge of the slider to prevent tipping of the slider.

36. The disc drive storage system of claim 18 wherein the trenches extend in a direction which is generally diagonal to a direction of the slider.

* * * * *